United States Patent
Clark et al.

(10) Patent No.: US 7,493,513 B2
(45) Date of Patent: Feb. 17, 2009

(54) AUTOMATICALLY FREEZING FUNCTIONALITY OF A COMPUTING ENTITY RESPONSIVE TO AN ERROR

(75) Inventors: Thomas K. Clark, Gresham, OR (US); Craig F. Everhart, Chapel Hill, NC (US); Venkateswararao Jujjuri, Beaverton, OR (US); Russell H. Weight, Hillsboro, OR (US)

(73) Assignee: International Business Machines Corporation, Armonk, NY (US)

( * ) Notice: Subject to any disclaimer, the term of this patent is extended or adjusted under 35 U.S.C. 154(b) by 1012 days.

(21) Appl. No.: 10/427,041

(22) Filed: Apr. 29, 2003

(65) Prior Publication Data

US 2004/0230877 A1 Nov. 18, 2004

(51) Int. Cl.
G06F 11/00 (2006.01)
(52) U.S. Cl. ............... 714/4; 709/224; 718/100
(58) Field of Classification Search ........... 714/4; 709/224; 718/100
See application file for complete search history.

(56) References Cited

U.S. PATENT DOCUMENTS

| | | | | |
|---|---|---|---|---|
| 5,317,739 A | | 5/1994 | Elko et al. ............... 395/650 |
| 5,418,916 A | | 5/1995 | Hall et al. ............... 395/375 |
| 5,463,625 A | * | 10/1995 | Yasrebi ............... 370/401 |
| 5,634,096 A | | 5/1997 | Baylor et al. ......... 395/182.04 |
| 5,659,682 A | * | 8/1997 | Devarakonda et al. ........ 714/47 |
| 5,765,151 A | * | 6/1998 | Senator ............... 707/8 |
| 6,016,500 A | * | 1/2000 | Waldo et al. ............ 707/202 |
| 6,247,139 B1 | * | 6/2001 | Walker et al. .............. 714/2 |
| 6,895,413 B2 | * | 5/2005 | Edwards ............... 707/201 |
| 6,901,596 B1 | * | 5/2005 | Galloway ............. 719/330 |
| 6,904,600 B1 | * | 6/2005 | James et al. .............. 719/328 |
| 2002/0083003 A1 | * | 6/2002 | Halliday et al. ........... 705/52 |
| 2002/0133738 A1 | | 9/2002 | Zeigler et al. |
| 2003/0018927 A1 | * | 1/2003 | Gadir et al. ............ 714/4 |

FOREIGN PATENT DOCUMENTS

| | | |
|---|---|---|
| JP | 62-204360 | 9/1987 |
| JP | 05-216854 | 8/1993 |
| JP | 7168729 A | 7/1995 |
| JP | 2001-134546 | 5/2001 |

OTHER PUBLICATIONS

"A Quick Check of Network Performance", Jeffrey T. Hicks, John Q. Walker II, International Journal of Network Management 2001: 11:65-72.

(Continued)

*Primary Examiner*—Scott T. Baderman
*Assistant Examiner*—Paul F. Contino
(74) *Attorney, Agent, or Firm*—Steven L. Bennett, Esq.; Kevin P. Radigan, Esq.; Heslin Rothenberg Farley & Mesiti, P.C.

(57) ABSTRACT

Facilitating error handling of computing environments, including those environments having file systems. Responsive to an entity of the computing environment, such as a client of a file system, obtaining at least an indication of an error, a portion of functionality of the entity is automatically frozen. The obtaining is, for instance, responsive to an event of another entity of the computing environment, such as a server of the file system. Eventually, the frozen functionality is thawed allowing the functionality to proceed.

13 Claims, 4 Drawing Sheets

OTHER PUBLICATIONS

"IBM Storage Tank™ A Distributed Storage System", IBM Corporation, Jan. 24, 2002, http//www.Almaden.IBM.com/StorageSystems/file-systems/storage-tank/extstoragetankpaper01_24_02.pdf.

* cited by examiner

AUTOMATICALLY FREEZING FUNCTIONALITY OF A COMPUTING ENTITY RESPONSIVE TO AN ERROR

TECHNICAL FIELD

This invention relates, in general, to processing within a computing environment, and in particular, to managing errors of the environment.

BACKGROUND ART

There are numerous types of errors that can occur in the various types of computing environments. For example, in those environments in which data is propagated to disk, errors can occur in the propagation. For instance, in a file system environment having, for instance, one or more clients coupled to one or more servers, data of a client is initially buffered on the client itself, and then, eventually, is flushed to one or more storage devices, such as one or more disks. If there is a failure, such as a hardware failure or server crash, there is a possibility that the data will never be written to the disk. Furthermore, if the application for which data is being written to disk exits before the data is stored on disk, there is a potential that the application is not aware of the data loss.

Although there are elaborate measures to ensure that the data is committed to disk, situations still occur that cause data to be lost. Thus, a need exists for a capability to handle such errors of a computing environment. As one example, a need exists for a capability that enables automatic freezing of at least a portion of functionality of a computing entity, in response to an error.

DISCLOSURE OF INVENTION

The shortcomings of the prior art are overcome and additional advantages are provided through the provision of a method of facilitating error handling of a computing environment. The method includes, for instance, obtaining, by an entity of the computing environment, at least an indication of an error responsive to an event of another entity of the computing environment, the another entity being remote to the entity; and automatically freezing a portion of functionality of the entity, in response to the obtaining.

In a further aspect of the present invention, a method of managing processing of a computing environment is provided. The method includes, for instance, detecting by an entity of the computing environment a situation in which processing of the entity is affected; and automatically freezing one or more distributed input/output (I/O) operations of the entity, in response to the detecting, wherein one or more other operations of the entity are allowed to proceed.

System and computer program products corresponding to the above-summarized methods are also described and claimed herein.

Additional features and advantages are realized through the techniques of the present invention. Other embodiments and aspects of the invention are described in detail herein and are considered a part of the claimed invention.

BRIEF DESCRIPTION OF DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

Overview

In accordance with an aspect of the present invention, a portion of functionality of a computing environment is automatically frozen, in response to a critical situation, such as a potential loss of data. In one particular example, the computing environment includes a client-server file system and the portion of functionality that is frozen includes one or more file system operations of a client in the file system. The freezing of functionality of the client (or other entity of the computing environment) includes altering behavior of one or more threads of the client (or other entity).

In a further aspect of the present invention, a capability is provided for thawing the frozen functionality. The thawing, as well as the freezing, occurs without requiring an unmount or remount of the file system (or a restart of the entity to be frozen and thawed).

DETAILED DESCRIPTION

Figure 1A:
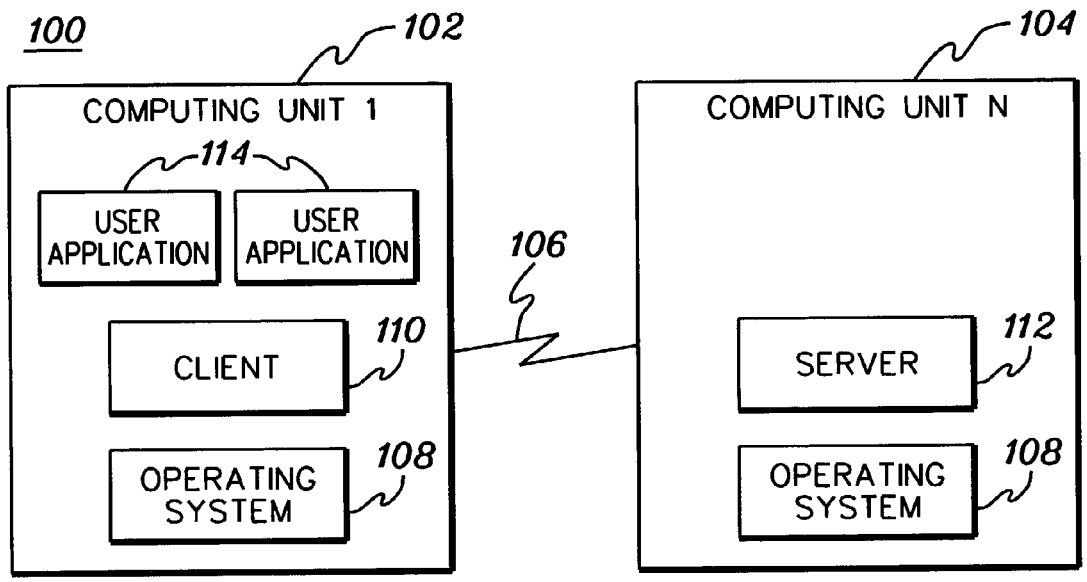
FIG. 1a depicts one embodiment of a computing environment to incorporate and use one or more aspects of the present invention.

One embodiment of a computing environment to incorporate and use one or more aspects of the present invention is described with reference to FIG. 1a. A computing environment 100 includes, for instance, a computing unit 102 coupled to another computing unit 104 via a connection 106. A computing unit includes, for instance, a personal computer, a laptop, a workstation, a mainframe, a mini-computer, or any other type of computing unit. Computing unit 102 may or may not be the same type of unit as computing unit 104. The connection coupling the units is a wire connection or any type of network connection, such as a local area network (LAN), a wide area network (WAN), a token ring, an Ethernet connection, an internet connection, etc.

In one example, each computing unit executes an operating system 108, such as, for instance, the z/OS operating system, offered by International Business Machines Corporation, Armonk, N.Y.; a UNIX operating system, such as AIX; Linux; Windows; or other operating systems, etc. The operating system of one computing unit may be the same or different from another computing unit. Further, in other examples, one or more of the computing units may not include an operating system.

In one embodiment, computing unit 102 includes a client application (a.k.a., a client) 110 which is coupled to a server application (a.k.a., a server) 112 on computing unit 104.

Client 110 communicates with server 112 via, for instance, the Network File System protocol (NFS) over a TCP/IP link coupling the applications. Further, on at least one computing unit, one or more user applications 114 may be executing.

Figure 1B:
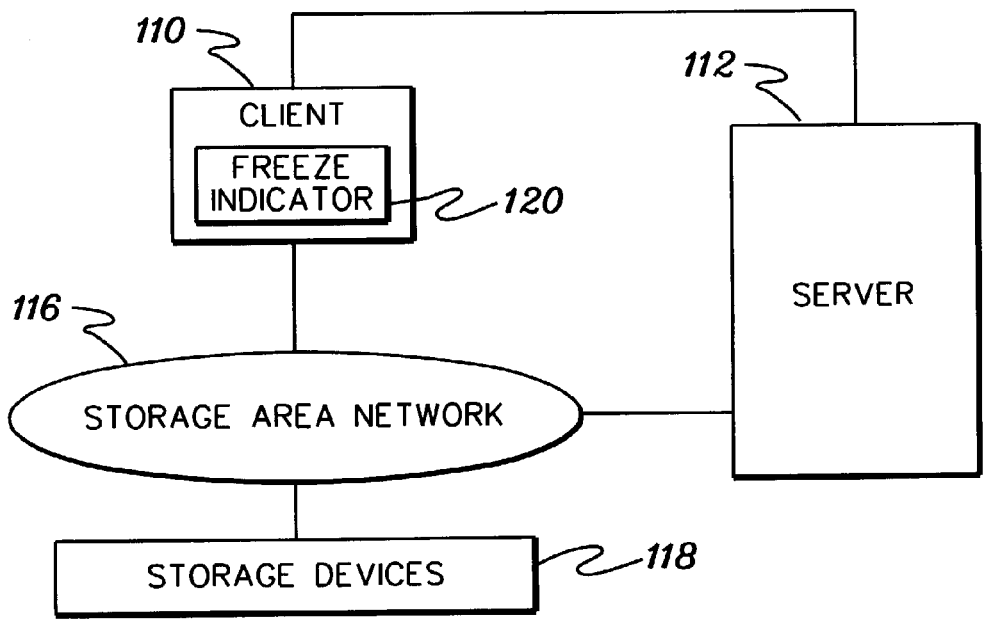
FIG. 1b depicts one embodiment of a file system to incorporate and use one or more aspects of the present invention.

In one particular embodiment, the environment includes a file system (FIG. 1b), such as a distributed file system, in which a storage area network 116 is employed to facilitate access by one or more clients 110 and one or more servers 112 to one or more storage devices 118 over a high speed link. The use of a storage area network enables the provision of high performance distributed file systems, which allow clients to obtain data directly from storage devices rather than accessing data through a remote server that performs reads and writes on their behalf. However, the client accesses are coordinated via one or more servers.

In a distributed file system, applications running on client computing units including, for instance, user applications, client applications, etc., access a file system namespace, which is, for instance, distributed across one or more computing units. The namespace includes one or more file system objects accessible by the applications. In one example, the name space is organized as a tree structure and includes various types of objects, such as, for instance, files, which include data accessible to clients; directories used to organize other objects; and symbolic links, which are points in the tree where the name lookup of an object is redirected.

Associated with the file system objects are, for instance, locks used to control access to the file system objects. There are various types of locks, including but not limited to, session locks used to coordinate access to file system objects between different clients of the file system; and data locks used to coordinate the caching of file system content in a client resident cache.

The validity of the locks are dependent, in part, on whether there is a valid lease between a particular client and server. The lease is a contract between a client and a server, in which the server guarantees correctness of the data in the client's cache for a specified period of time designated in the lease. The lease can be renewed before it expires. However, if a lease is not renewed (e.g., because of a disconnect, server crash, or for any other reason), then at the end of the lease period, the locks obtained during the lease are invalidated. The client cannot operate on the cached data when it does not have a valid lock. Thus, to proceed with one or more operations (e.g., read, write, find, etc.) on a file system object, the client reidentifies itself with the server to enter a new lease, and attempts to reassert the invalid locks.

To facilitate processing within a computing environment, various threads of control (i.e., threads) are used for specific functions. For instance, in one example of a file system environment, one or more transmitter threads are used to transmit messages to, for instance, one or more servers; one or more receive threads are used to receive messages from, for instance, one or more servers; one or more lease renewal threads are used in renewing leases between clients and servers; and one or more lock reassertion threads are used in forwarding messages associated with reasserting invalidated locks.

Processing within many computing environments is also facilitated by the capability of buffering data and then writing the data out to storage devices, such as disks. For example, data located in buffers that are local to an entity of a computing environment (e.g., a client of a file system) is written out to one or more storage devices, such that the data can be committed to the devices. During this data propagation, a failure, such as a hardware failure on an entity remote to the buffering entity (e.g., a server of the file system or on disk), can cause data to be lost. To minimize the loss of data, actions are taken to manage the failure and/or errors. One embodiment of the logic associated with such management is described with reference to FIG. 2.

Figure 2:
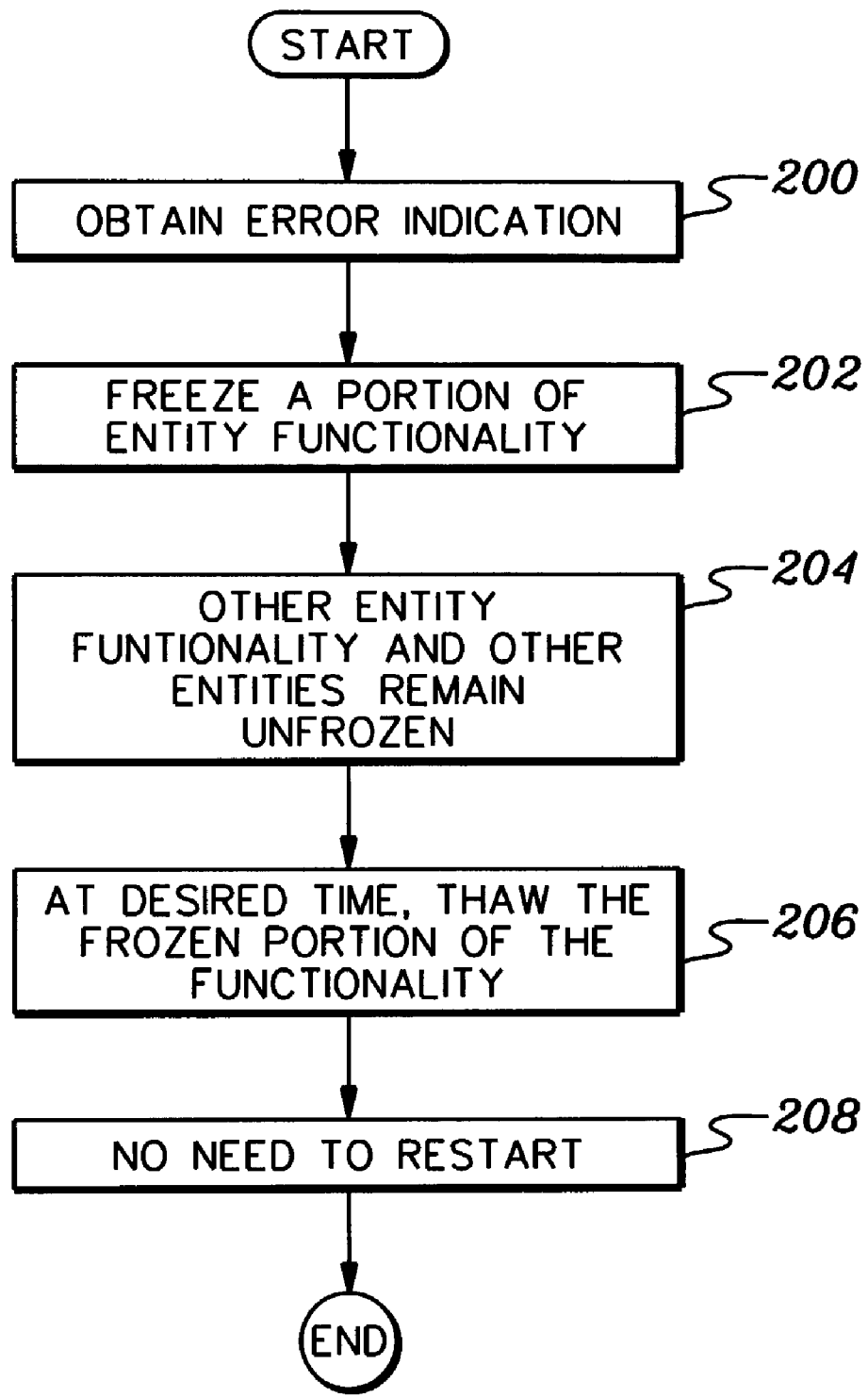
FIG. 2 depicts one embodiment of an overview of an error management capability of an aspect of the present invention.

FIG. 2 depicts one example of an overview of a management capability of an aspect of the present invention. In one example, this logic is executed by an entity of the computing environment, such as a client of a file system. For instance, it is executed by the entity that obtains an indication of an error (e.g., detects the error; detects a situation causing an error; receives an indication of the error; has the error indication; etc.) or other situation that affects the entity's processing.

Referring to FIG. 2, an indication of an error is obtained by an entity of the computing environment (e.g., a client), STEP 200. In one example, there is an indication of a potential data loss, which is considered a critical error. However, other errors can be defined as critical, as desired. Errors that result in functionality of an entity being frozen are considered herein as critical errors. Further, any situation that results in freezing of functionality is referred to herein as an error.

In one example, the obtaining of an indication of an error includes a denial of the ability to write dirty data from the entity's cache out to disk. This denial may be provided, for instance, when the disk is missing, or in a further example, when the entity is denied a lock or other mechanism employed to write the dirty data from cache to disk. This latter example is described in further detail below with reference to a file system environment.

In one example, a client of the file system requests a lock, such as a data lock, from a server of the file system that is remote from the client. The lock has a particular version number associated therewith, and the client updates a file using that data lock. The file is dirty, since data is written into the cache that now needs to be written out to disk. The connection between the client and server breaks. Further, the lease associated with the lock expires, and therefore, the client needs to obtain permission from the server to extend the lock before writing the data to the cache. When the connection comes back, the client communicates with the server via a handshake protocol, in which the client introduces itself back to the server. Further, the client requests the data lock back. If the server denies that data lock for one or more reasons, such as it cannot provide the lock with the same version or for any other reason, the client receives a lock reassertion denial, which prohibits the client from propagating the data from the cache to disk. Thus, the cached data is discarded, which is a critical error. The client obtains an indication of this error (e.g., determines it has lost data; receives the lock reassertion denial; and/or has other indications).

Responsive to obtaining the error indication, a portion of functionality of the entity is frozen, STEP 202. In one embodiment in which the entity is a client of a file system, it is one or more file system operations (e.g., those requiring server communication or communication to a remote storage system) that are frozen. However, other functionality of the entity and/or other entities of the environment, including, for instance, other client applications, server applications and/or user applications are not frozen and continue to process, STEP 204. The freezing of the entity functionality alerts a system administrator or others of an undesirable situation that now can be handled.

Subsequent to handling the situation, which includes fixing the error, bypassing the error, ignoring the error or any other handling technique, or at another desired time, the frozen portion of the entity is thawed, STEP 206. This enables the client or other frozen entity to resume processing, as before.

The thawing, as well as the freezing, is performed without requiring a restart of the entity or in the case of a file system, without requiring an unmount or remount of the file system, STEP 208.

Figure 3:
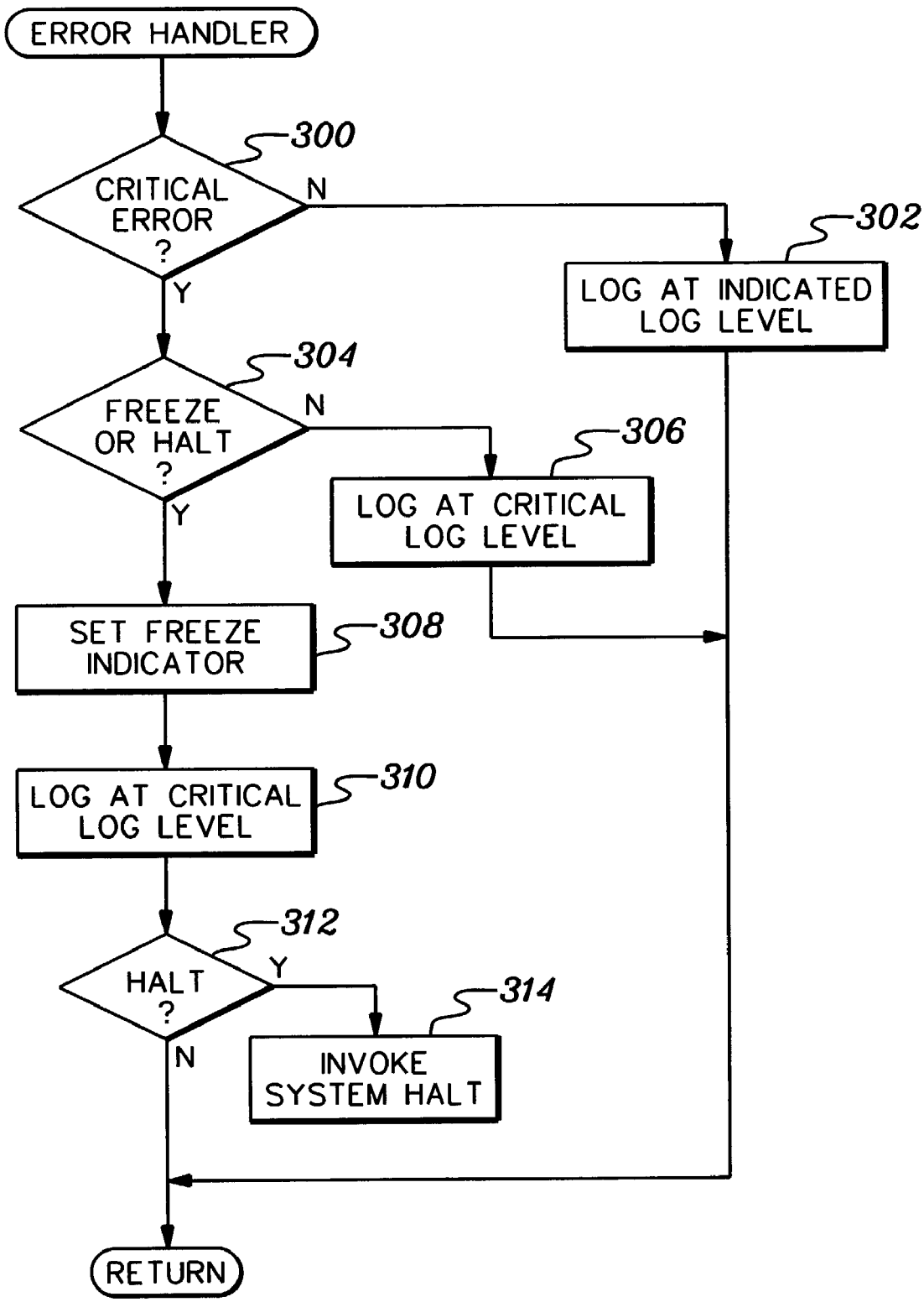
FIG. 3 depicts one embodiment of the logic associated with handling a critical error, in accordance with an aspect of the present invention.
Figure 4:
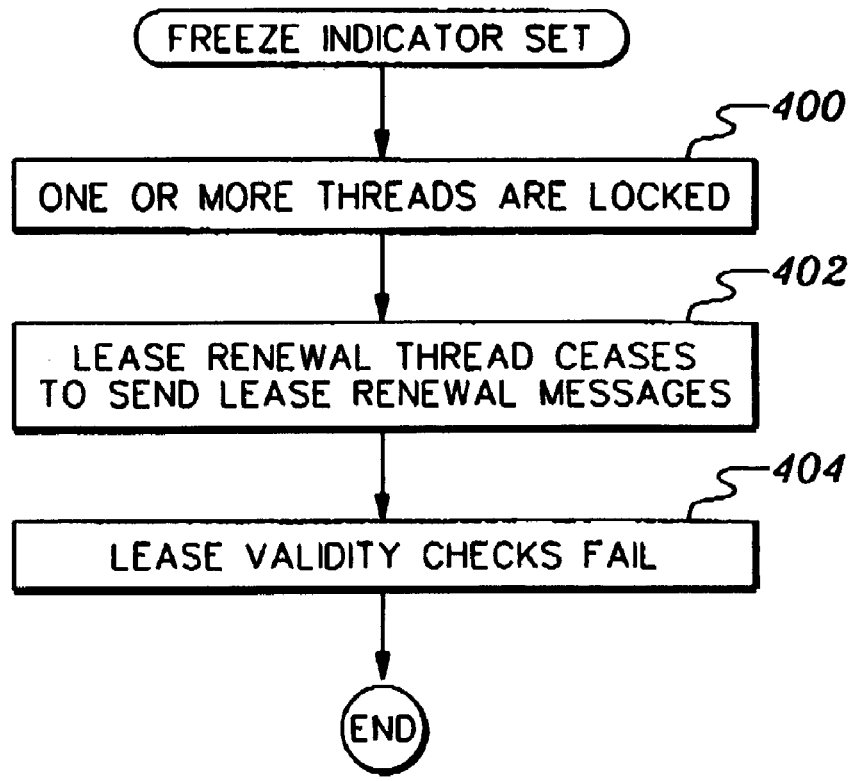
FIG. 4 depicts one embodiment of the logic responsive to setting a freeze indicator, in accordance with an aspect of the present invention.
Figure 5:
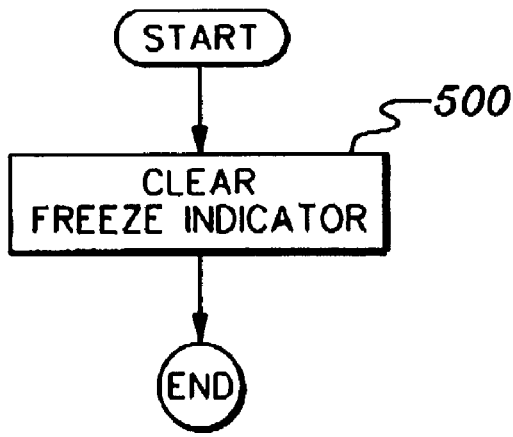
FIG. 5 depicts one embodiment of the logic associated with thawing a freeze, in accordance with an aspect of the present invention.

Further details associated with the freezing and thawing of at least a portion of functionality of an entity are described with reference to FIGS. 3-5. These details are described with reference to a file system having at least one client that is coupled to but remote from at least one server of a file system. However, one or more aspects of the present invention are equally applicable to other computing environments and other entities of those environments. As one example, FIG. 3 depicts one embodiment of the logic associated with freezing one or more file system operations of a client; FIG. 4 depicts examples of actions that occur responsive to the freezing; and FIG. 5 depicts one embodiment of the logic associated with thawing the frozen operations.

In one example, the freezing of a portion of functionality of a client of a file system is described in context of an error handling routine. Various types of errors, in this example, are handled differently. It is the user (e.g., system administrator), at startup, that determines how a type of error, and thus, the file system, is to be managed. For instance, the user can designate for a particular error, an error routine of log only, log and freeze, or log and halt, each of which is described below.

Referring to FIG. 3, an error handler routine is invoked, by a client, in response to an error. Thus, a determination is made as to whether the error is a critical error, INQUIRY 300. If not, then the error is logged at the log level indicated by the user, at start-up, STEP 302. That is, for different errors, different behavior may be implemented. For instance, the more severe the error, the more places a message may be sent. As examples, in addition to the log, a system administrator and/or all users may receive notice of the error.

If the error is a critical error, then a further determination is made as to whether a freeze or halt is indicated for that error, INQUIRY 304. Should there be no indication of freeze or halt, then the error is logged at the appropriate log level for a critical error, STEP 306. However, if the error is a critical error and freeze or halt is indicated, then a freeze indicator is set, STEP 308. In one example, this freeze indicator is a flag located within the client, as shown at reference 120 in FIG. 1b. In one particular example, the freeze indicator is located within a client state manager (CSM) component of the client, which is platform independent. The CSM is, for instance, responsible for facilitating communications with a server, and for executing the logic of one or more aspects of the present invention. The CSM is coupled to an Installable File System (IFS) component of the client, which is platform dependent. The freeze indicator is accessible to the various threads of the client.

Returning to FIG. 3, subsequent to setting the freeze indicator, logging is performed at an appropriate log level (e.g., the critical level), STEP 310. Thereafter, a determination is made as to whether a halt is indicated, INQUIRY 312. If so, then system halt is invoked, STEP 314. As one example, the halt is provided as a feature of a given operating system. For instance, for AIX, halt is invoked via a call of a Panic routine. If halt is not indicated, then processing of the error handler routine is complete.

As described above, in certain error scenarios, a freeze indicator is set. Responsive to setting the freeze indicator, at least a portion of functionality of the file system is frozen. In one example, it is the file system operations relating to server communications or other remote communications of the client in which the error is indicated that is frozen. Other functionality of the client, including other file system operations; other clients, servers and other aspects of the file system are not frozen. The freezing affects or alters the behavior of the client file system. For example, the behavior of one or more threads of the client file system are affected, as described below.

Referring to FIG. 4, one or more of the threads are locked, STEP 400. For instance, the receiver, transmitter and lock reassertion threads are locked by looping around, for instance, a one second sleep loop waiting for the freeze indicator to be reset. That is, those threads are stalled awaiting a resetting of the indicator, which is periodically checked.

In addition to the above, the lease renewal thread ceases to send lease renewal messages, STEP 402. In this example, the lease renewal thread continues its normal functions, except that it ceases to send lease renewal messages to the server. Thus, a check is made on the particular function being performed, and if it is a sending of a lease renewal message, then it is prohibited.

Moreover, any lease validity checks fail, STEP 404. When a lease fails, this affects various locks associated with the lease, such as the data locks and session locks. Thus, when a lease validity check fails, so do any data lock and/or session lock validity checks. The file system behaves as though all the locks have been invalidated. This has the effect of preventing new disk I/O's from being initiated. Further, the client ceases any attempts to restore data and/or session locks. This causes the locks to expire and to be marked invalid. This concludes the processing associated with setting the freeze indicator.

During the time that the file system is frozen, an administrator may take advantage of the various tools available to address the data loss issue. The manner in which to proceed with the data loss is specific to the particular file system, the particular administrator and/or the particular client, and is not pertinent to one or more aspects of the present invention. In one example, however, after the error is handled (e.g., fixed, ignored, bypassed, etc.), the frozen functionality is thawed. This is performed by the client having the frozen file system operations and is performed without requiring an unmount and/or remount of the file system.

One embodiment of the logic associated with thawing is described with reference to FIG. 5. The thawing of the file system includes clearing the freeze indicator, STEP 500. When the indicator is cleared or reset, the threads are allowed to resume normal operation. For instance, the transmit, receive, and lock reassertion threads are unlocked; the renewal threads are allowed to send lease renewal messages; and the lease validity checks may be successful, once again.

Advantages

Described in detail above is a capability that enables a portion of functionality of an entity to be frozen, in response to obtaining at least an indication of an error. In one example, the entity obtaining the error indication is intimately familiar with the data associated with the error indication. The entity is able to stop further I/O activity or activity of a distributed nature, which advantageously, increases the chances of preserving at lease some of the data that may be lost.

Advantageously, this capability enables the selective freezing of portions of the entity, while allowing other portions of the entity, other entities (e.g., clients and servers), or other aspects of the computing environment to continue normal processing.

ALTERNATE EMBODIMENTS

Although preferred embodiments have been depicted and described in detail herein, it will be apparent to those skilled in the relevant art that various modifications, additions, substitutions and the like can be made without departing from the spirit of the invention, and these are, therefore, considered to be within the scope of the invention, as defined in the following claims.

For example, although in one embodiment described above, one client is coupled to one server, in other embodiments, one or more clients may be coupled to one or more servers or any combination thereof. The one or more clients may be on one or more computing units. Similarly, the one or more servers may be on one or more computing units. Further, the one or more clients and one or more servers may be on one computing unit. Moreover, in another embodiment, there may be no user applications executing on the computing units.

In addition to the above, although various threads are described herein, more, less or different threads may be affected without departing from the spirit of one or more aspects of the present invention. Moreover, more, less or different actions may be taken in response to setting the freeze indicator.

Additionally, although examples of computing environments have been provided, these are only examples. Other environments may be used. For instance, although an example is described herein with reference to a distributed file system, this is only one example. One or more aspects of the present invention are applicable to other environments.

For example, in yet another embodiment, the file system may be a local file system, in which buffered data is not able to be written to disk, because of a disk crash, as one example. The operating system no longer has access to the disk, and thus, file system functionality of the operating system is frozen.

In yet other embodiments, the computing environment need not include a file system.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

The present invention can be included in an article of manufacture (e.g., one or more computer program products) having, for instance, computer usable media. The media has therein, for instance, computer readable program code means or logic (e.g., instructions, code, commands, etc.) to provide and facilitate the capabilities of the present invention. The article of manufacture can be included as a part of a computer system or sold separately.

Additionally, at least one program storage device readable by a machine embodying at least one program of instructions executable by the machine to perform the capabilities of the present invention can be provided.

What is claimed is:

1. A method of facilitating error handling of a computing environment, said method comprising:

obtaining, by a client portion of a client-server application of the computing environment, an error indication responsive to an event of another entity of the client-server application of the computing environment that effects the client portion's processing, said another entity being a server portion of the client-server application remote from the client portion of the client-server application, and the client-server application being a file system application; and automatically freezing by the client portion of the client-server application a portion of functionality of the client portion of the client-server application, in response to the obtaining the error indication by the client portion, wherein another portion of functionality of the client portion remains unfrozen and continues to process, and the portion of functionality of the client portion automatically frozen comprises a file system operation affected by the event requiring server portion communication or communication to a remote storage system, and the another portion of functionality of the client portion remaining unfrozen comprises another file system operation unaffected by the event, wherein the automatically freezing comprises stalling processing of at least one thread of the client portion while a freeze indicator flag is set, and concurrently allowing at least one other thread of the client portion to process.

2. The method of claim 1, wherein responsive to the obtaining, the client portion determines whether the event is a critical error, and if not, determines whether a freeze response is predefined for that event, and if so, proceeds with the automatically freezing.

3. The method of claim 2, further comprising setting a freeze indicator flag within a client state manager (CSM) component of the client portion, the CSM component being responsible for facilitating communications with the server portion.

4. The method of claim 3, wherein the client portion is multi-threaded, with the freeze indicator flag being accessible to the threads of the client portion.

5. The method of claim 4, wherein the automatically freezing comprises altering behavior of one or more threads of the client portion of the client-server application, in response to setting the freeze indicator flag.

6. The method of claim 4, wherein the automatically freezing comprises failing one or more validity checks, in response to setting the freeze indicator flag.

7. The method of claim 1, further comprising ceasing, by a lease renewal thread of the client portion, to send lease renewal messages to the server portion when the freeze indicator flag is set, and automatically failing any lease validity checks responsive to the freeze indicator flag being set.

8. The method of claim 1, wherein the automatically freezing comprises altering behavior of one or more threads of the client portion of the client-server application.

9. The method of claim 8, wherein the altering behavior comprises locking at least one thread of the one or more threads of the client portion.

10. The method of claim 8, wherein the altering behavior comprises prohibiting at least one thread of the one or more threads of the client portion from sending one or more messages to the server portion of the client-server application or to the remote storage system.

11. The method of claim 1, wherein the automatically freezing comprises failing one or more lease validity checks of the client portion.

12. The method of claim 1, further comprising thawing the portion of functionality of the client portion that is frozen without requiring an unmount or remount of the file system application.

13. The method of claim 12, wherein the thawing comprises resetting a freeze indicator of the client portion, unlocking transmit, receive and lock reassertion threads of the client portion, and allowing renewal threads of the client portion to send lease renewal messages.

* * * * *